United States Patent [19]

Kuhns

[11] Patent Number: 4,646,942
[45] Date of Patent: Mar. 3, 1987

[54] MULTIWAY GRAVITY BOX AND DOOR ASSEMBLY

[75] Inventor: Abe B. Kuhns, Arthur, Ill.
[73] Assignee: E-Z Trail, Inc., Arthur, Ill.
[21] Appl. No.: 605,860
[22] Filed: May 1, 1984
[51] Int. Cl.[4] .......... B67D 5/60; B67D 47/00; B67D 43/26; B60P 3/24
[52] U.S. Cl. ............... 222/144.5; 222/561; 222/506; 222/486; 222/502; 222/487; 222/545; 298/8 H; 298/24; 220/262
[58] Field of Search ............ 222/144.5, 505, 506, 222/502, 486, 487, 485, 42, 43, 44, 45, 503, 545, 559, 561; 105/247, 282 P, 280, 248, 256, 239; 137/635; 298/8 H, 24; 74/22 A

[56] References Cited

U.S. PATENT DOCUMENTS

| | | | |
|---|---|---|---|
| 2,005,552 | 6/1935 | McAfee | 298/24 |
| 2,989,008 | 6/1961 | Lindstrom | 222/505 |
| 2,989,930 | 6/1961 | Flowers | 105/239 |
| 3,521,930 | 7/1970 | Tucker | 298/24 |
| 3,554,576 | 1/1971 | Parker | 298/24 X |
| 3,997,215 | 12/1976 | Parker et al. | 298/24 |
| 4,320,860 | 3/1982 | Koch et al. | 222/502 |
| 4,388,026 | 6/1983 | Green | 222/561 |
| 4,523,690 | 6/1985 | Cornelius | 220/262 |

OTHER PUBLICATIONS

*Fast Unloading Gravity Flow Grain Boxes;* 1983, Unverferth Manufacturing Co.; Kalida, Ohio 45853.

Primary Examiner—Joseph J. Rolla
Assistant Examiner—Gregory L. Huson
Attorney, Agent, or Firm—Lockwood, Alex, FitzGibbon & Cummings

[57] ABSTRACT

A multiway gravity box and door assembly is capable of selectively storing, transporting and/or dispensing different particulate solid materials. The gravity box has a partition wall to separate the box into two separate compartments each of which communicates with a separate discharge opening from the gravity box. First and second doors are slidably movable in the respective openings and a third outer door overlies the first and second doors and is also slidably movable. Pins are selectively positionable to engage the outer door and either one or both of the first and second doors to selectively open or close the first and second doors when the outer door is opened or closed.

15 Claims, 6 Drawing Figures

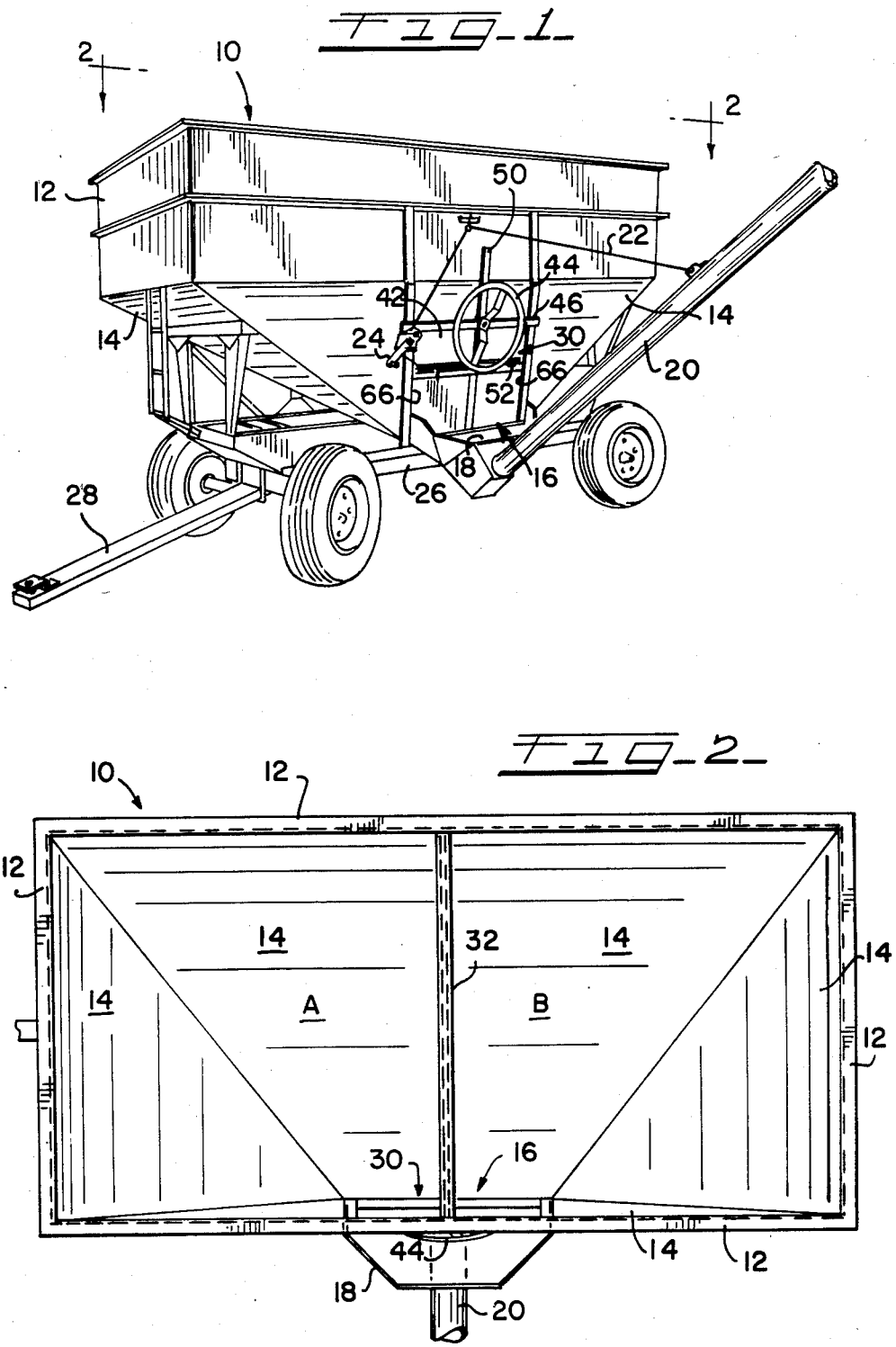

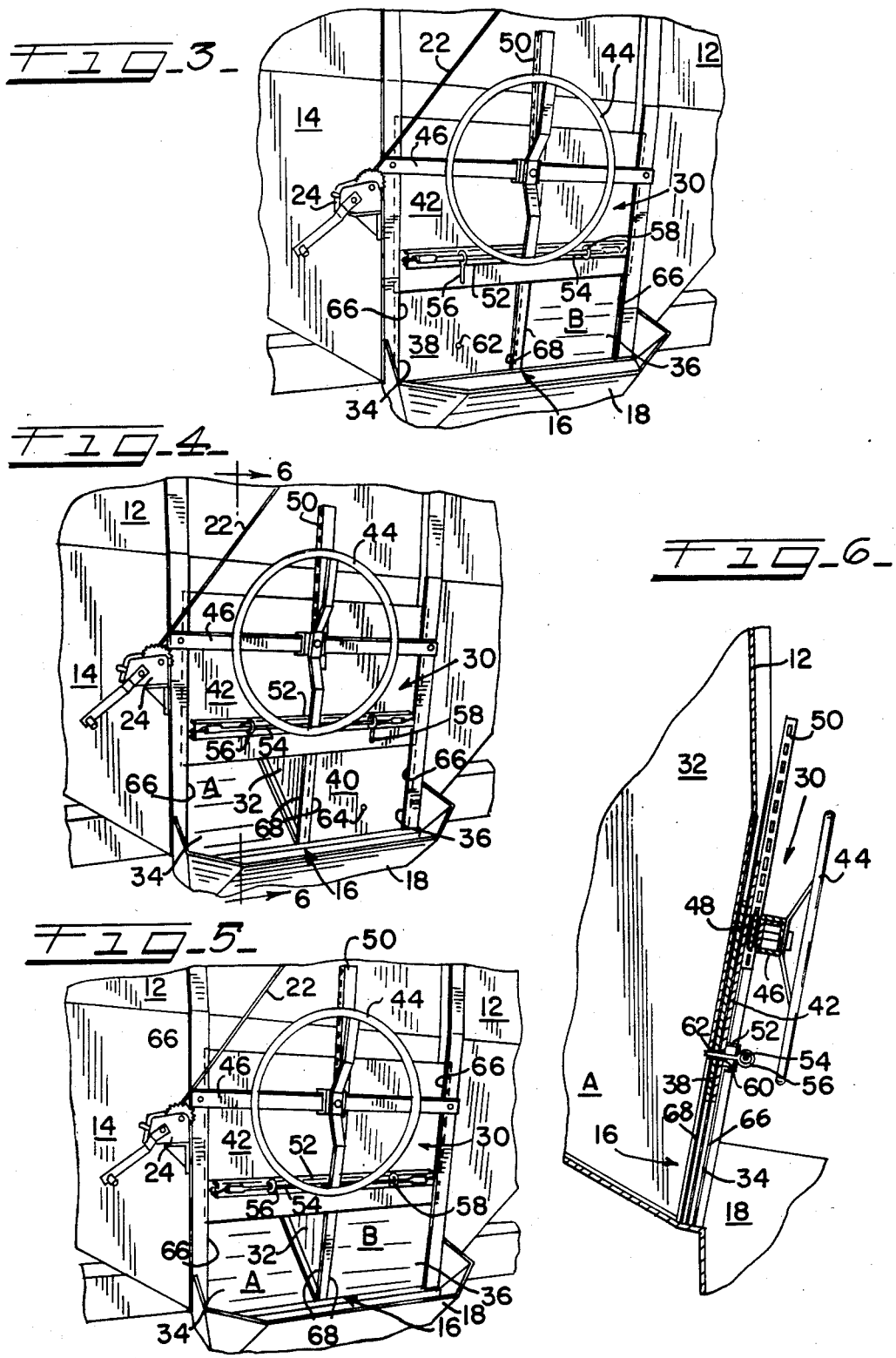

MULTIWAY GRAVITY BOX AND DOOR ASSEMBLY

BACKGROUND AND SUMMARY OF THE INVENTION

The present invention relates to a multiway gravity box door and, more particularly, to a multiway gravity box or hopper container and door assembly for selectively storing, transporting and dispensing materials of differing kinds.

Both stationary and transportable hopper containers or gravity boxes have been widely employed in the past for storing, transporting and/or dispensing particulate solid materials. By way of example, transportable gravity boxes have been employed in agriculture for transporting seed, fertilizers and other solid particulate materials to the field where the materials may be used to replenish seed planters and/or fertilizer spreaders in the field.

Most of these prior gravity boxes have only single discharge doors and generally are capable of transporting and dispensing one kind of lading or material at a time, e.g. seed or fertilizer. It is not unusual, however, that a given operation in the field will involve multiple activities at the same time. For example, at planting time, seed and fertilizer are frequently applied to the soil, either in the same pass with the seeder planter or the seed may be applied by a seeder which is immediately followed by a fertilizer applicator or vice versa.

Because these prior single door gravity boxes have been generally capable of transporting and dispensing only one kind of particulate material on the same trip, in order to replenish both of the aforementioned pieces of equipment during the planting operation, it has usually been necessary to provide two gravity boxes at the site of planting, one for replenishing the seed and the other for replenishing the fertilizer. Depending upon the size of the area to be seeded and/or fertilized, it is not uncommon for the situation to occur that neither of these gravity boxes will be filled to their capacity with either seed or fertilizer. Indeed, only one gravity box might have been adequate to transport both the seed and the fertilizer which is needed in a given day's operation, if provision could have been made to separate these two distinct particulate materials in the gravity box and selectively dispense these materials as they are needed. Moreover, it would be desirable if a gravity box which would be capable of such selective dispensing and replenishing, would also be capable, in the alternative, of performing as the prior gravity boxes performed, i.e. to transport and dispense only one material, such as where a large area of land is to be treated in a given day.

Large compartmented gravity boxes having dual compartments and doors have also been employed in the past. The reason for the dual compartments and doors in these gravity boxes has been due to their size, i.e. because the gravity boxes are so large that a single discharge door does not suffice for complete emptying and they are compartmented to allow for use where only a lesser amount of materials are to be transported. As a result, both of the doors are of full standard size and are placed side by side, thereby, necessitating a discharge chute of excessive width to span the side by side standard sized doors. Accordingly, these large gravity boxes are not readily adapted to the use of an auger for unloading and each of the discharge doors are only operable independently of each other and cannot be operated simultaneously.

A gravity box and door assembly incorporating the principles of the present invention is capable of readily performing all of the aforementioned functions and overcomes the problems encountered in the prior gravity boxes. A gravity box and door assembly incorporating the principles of the present invention is capable of selectively storing, transporting and dispensing disparate forms of particulate solid material with economy, ease of operation and a minimum of complexity and expense. Accordingly, a single such gravity box may frequently fulfill a given day's needs where two gravity boxes were previously necessary. In the alternative, a gravity box and door assembly incorporating the principles of the present invention may be readily converted to store, transport and dispense only a single type of particulate material as did the prior gravity boxes, if that is what is desired, without removal or addition of any components to convert the gravity box for this alternative mode of use. In a gravity box and door assembly incorporating the principles of the present invention, a pair of doors are provided which have a total combined width which is only substantially the same as the prior single door gravity boxes and, thereby, the discharge chute may be of shorter length to readily accommodate an auger for unloading of the gravity box. Moreover, the doors of the door assembly incorporating the principles of the present invention may be selectively operated either individually or simultaneously.

In one principal aspect of the present invention, a multiway gravity box and door assembly incorporating the principles of the present invention includes a hopper container defined by a plurality of walls, a partition wall in the hopper container dividing and separating the hopper container into at least two compartments, and first and second openings in at least one of the walls of the hopper container for discharging materials from the compartments. The first opening communicates with one of the compartments and a second opening communicates with the other of the compartments. A first door is slidably movable to cover and uncover the first opening and a second door is slidably movable to cover and uncover the second opening. Operating means selectively moves the first and second doors. The operating means includes a movable engaging means for selectively engaging either of the doors or in the alternative both of the doors simultaneously, and means for moving the movable engaging means in the direction in which the doors slidably move when engaged by the movable engaging means.

In another principal aspect of the present invention, both of the first and second doors include a pin receiving opening therein, and the movable engaging means comprises a pin carrier having a pair of spaced pins thereon, the pin carrier being movable to position the pins adjacent the respective pin receiving openings in the first and second doors, and the pins are selectively insertable in one or both of the pin receiving openings to engage the pin carrier with either one or both of the doors.

In another principal aspect of the present invention, the aforementioned engaging means comprises a third slidable door overlying the first and second doors.

In still another principal aspect of the present invention, the openings include track means adjacent their side edges in which the first and second doors are slidable.

In still another principal aspect of the present invention, the aforementioned multiway gravity box and door assembly includes means for transporting the hopper container.

In still another principal aspect of the present invention, the aforementioned partition wall divides the first and second openings from each other.

These and other objects, features and advantages of the present invention will be more clearly understood through a consideration of the following detailed description.

BRIEF DESCRIPTION OF THE DRAWINGS

In the course of this description reference will frequently be made to the attached drawings in which:

FIG. 1 is a perspective view of a preferred embodiment of multiway gravity box constructed in accordance with the principles of the present invention;

FIG. 2 is a partially broken, plan view of the multiway gravity box, as viewed substantially along line 2—2 of FIG. 1;

FIG. 3 is a broken, enlarged perspective view of the door assembly of the multiway gravity box shown in FIG. 1 in which the right side of the discharge opening of the gravity box is shown opened and the left side closed;

FIG. 4 is a broken, enlarged perspective view of the door assembly shown in FIG. 3, but in which the open and closed conditions of the openings are reversed;

FIG. 5 is a broken, enlarged perspective view of the door assembly shown in FIG. 3, but in which both of the openings are opened; and FIG. 6 is a still further enlarged, broken, cross-sectioned side elevational view of the door assembly, as viewed substantially along line 6—6 of FIG. 4.

DESCRIPTION OF THE PREFERRED EMBODIMENT

A preferred embodiment of multiway gravity box and door assembly is shown generally in FIG. 1.

The gravity box 10 comprises a plurality of generally vertical walls 12 arranged in the form of a rectangle to contain solid particulate materials at the top of the gravity box. Extending downwardly from the vertical walls 12, are a like number of inclined walls 14 which generally define a hopper container in which particulate materials within the hopper container are fed by gravity toward the bottom of the container.

A discharge opening, generally 16, is located in one of the inclined side walls 14 adjacent the bottom of the hopper container to discharge materials therefrom to a discharge chute 18. The materials entering the discharge chute are removed from the chute by way of a powered auger tube 20, as shown in FIG. 1, which is mounted on the discharge chute 18. The discharge end of the auger tube 20 may be moved to a desired position by moving the tube itself and may be fixed in its desired position by way of a cable 22 and winch mechanism 24 in a well known manner.

The entire gravity box may be mounted on a transportable wheeled frame 26, as shown in FIG. 1, and may be drawn by way of, for example, a trailer hitch 28 to transport the gravity box 10 and its lading to a desired location in the field.

In order to control the flow of material through the discharge opening 16, a slidable gate or door assembly, generally 30, is provided.

The gravity box construction which has thus far been described is conventional. The preferred embodiment of multiway gravity box and door assembly of the present invention will now be described.

In the gravity box of the present invention, a partition wall 32 is positioned within the gravity box 10 to divide and separate the gravity box or hopper container into two separate compartments A and B. The partition wall 32 preferably extends to the top of the hopper container and extends downwardly to the bottom of the hopper container and adjacent the discharge opening 16, such that it divides the discharge opening into a first opening 34 which communicates with compartment A and a second opening 36 which communicates with compartment B, as shown in FIGS. 3-5. First and second doors 38 and 40, respectively, are slidably positioned to cover and uncover the first and second openings 34 and 36, respectively. The first and second doors 38 and 40 are positioned in generally side-by-side relationship, as best shown in FIGS. 3-5, and are also positioned beneath a third door 42 which spans the entire discharge opening 16 in the preferred form shown in the drawings. The door 42 may comprise, for example, a sliding gate or door which is typically found on gravity boxes of the prior art.

Door 42 is slidably operated up and down by an operating mechanism which, as shown in the drawings, comprises a manual operating wheel 44 which is rotatably mounted upon a stationary crossbeam 46, the latter of which is fixed to the side of the gravity box 10. The operating wheel 44 includes a gear 48, as best seen in FIG. 6, which engages a generally vertically extending rack 50 which is fixed to the third full door 42, such as by welding. Thereby, rotation of the operating wheel 44 will cause the rack 50 and the door 42 to move up or down, depending upon the direction in which the operating wheel is rotated.

A pin carrying channel 52 is also fixed to the outer or third door 42 so as to extend transversely of the door 42 adjacent its bottom. The channel 52 and the third door 42, either separately or together, thereby define a movable engaging member which overlies the doors 38 and 40. If it is desired to eliminate the third outer door, the channel 52 could be fixed directly to the rack 50. The movable engaging member also includes a resilient pin mounting member 54 which is carried on the pin carrying channel 52 which mounts a pair of laterally spaced pins 56 and 58 to the channel, as best seen in FIGS. 3-6. The resilient mounting member 54 may, for example, comprise a stretchable rubber strap which is hooked over the ends of the channel.

Pin receiving openings 60 are laterally spaced beneath the pin carrying channel 52 and through the outer third door 42, one such opening 60 being shown in FIG. 6. The openings 60 are positioned adjacent the pins 56 and 58 and also are positioned to overlie pin receiving openings 62 and 64 in the first and second doors 38 and 40, respectively, when all of the doors are in their lowered closed positions. When a given one of the pins 56 and/or 58 is inserted through its opening 60 in door 42 and is engaged in its respective pin receiving openings 62 and/or 64 in the inner doors 38 and 40, the inner door will be engaged with the outer third door 42 and the pin carrying channel such that the inner door will slidably operate in unison with the outer door when the outer door is moved. Conversely, when one or both of the respective pins 56 and/or 58 are withdrawn and disengaged from these pin openings, the respective inner doors will remain inoperative and in the down position when the outer third door 42 is raised.

Tracks 66 in the form of channels are preferably provided adjacent the side edges of the discharge opening 16 in which the outer edges of both the first and second inner doors 38 and 40 and the outer third door 42 are guided for slidable movement. In addition, the edge of the partition 32 may also carry tracks 68 in the form of channels in which the inner edges of the first and second inner doors 38 and 40 are guided for slidable movement and are held in position against the weight of the materials in their respective compartments when either door is closed, but the outer third door 42 is opened.

Although it is believed from the foregoing description that the operation of the present invention will be apparent to those skilled in the art, a brief description of the operation will follow.

It will first be assumed that the gravity box 10 has been filled with two different kinds of particulate material in each of the respective compartments A and B.

If it is desired to dispense only materials from compartment B through the second opening 36, the following will take place. Initially, all of the doors 38, 40 and 42 will be in their lowered position. In this position, the pin openings 60 in the outer door and the pin openings 62 and 64 in the respective inner doors will all be aligned with each other. In order to open the inner second door 40 to compartment B, its pin 58 will be inserted through its pin openings 60 in the outer door 42 and 64 in the inner door 40. The other pin 56 will be withdrawn from its pin openings, as shown in FIG. 3. All that is now necessary is to raise the outer third door 42 by an amount sufficient to open opening 36 to the extent desired to discharge materials from compartment B to the discharge chute 18. As shown in FIG. 3, as the outer door 42 is raised, the inner door 40 will also be raised by the same amount as the outer door due to the engagement by the pin 58. However, the other inner door 38 will remain in its lowered position as the outer door 42 is raised, and as shown in FIG. 3.

If it is desired to discharge material from compartment A instead of compartment B, the aforementioned procedure is reversed, i.e. the pin 8 is withdrawn from its pin openings and the pin 56 is inserted through its pin openings 60 in the outer door 42 and 62 in the inner door 38. As the outer door 42 is now raised, the inner door 38 to compartment A will also be raised by a like amount and the inner door 40 to compartment B will remain closed, as shown in FIG. 4.

Finally, if it is desired to discharge material simultaneously from both compartments A and B, both pins 56 and 58 will be inserted through their respective pin openings and both inner doors 38 and 40 will raise as the outer door 42 is raised as shown in FIG. 5.

It will be understood that although the present invention has been described in terms of a transportable gravity box, that the principles of the present invention are equally applicable to storage containers of other kinds whether they be transportable or stationary.

It will also be understood that the embodiment of the present invention which has been described is merely illustrative of an application of the principles of the invention. Numerous modifications may be made by those skilled in the art without departing from the spirit and scope of the invention.

What I claim is:

1. A multiway gravity box and door assembly comprising:
    a hopper container defined by a plurality of walls;
    a partition wall in said hopper container dividing and separating said hopper container into at least two compartments;
    first and second openings in at least one of the walls of said hopper container for discharging materials from said compartments, respectively, said first opening communicating with one of said compartments and said second opening communicating with the other of said compartments;
    a first door slidably movable to cover and uncover said first opening;
    a second door slidably movable to cover and uncover said second opening; and
    operating means for selectively moving said first and second doors, said operating means comprising movable engaging means for selectively engaging and disengaging with either of said doors or in the alternative both of said doors simultaneously, said movable engaging means including a member overlying both of said doors, and means for moving said movable engaging means in the direction in which said doors slidably move when engaged by said movable engaging means.

2. The multiway gravity box and door assembly of claim 1, wherein said partition wall divides said first and second openings from each other.

3. The multiway gravity box and door assembly of claim 1, including means for transporting said hopper container.

4. The multiway gravity box and door assembly of claim 1, wherein said means for moving said engaging means comprises a rack fixed to said engaging means, and a manual hand wheel engaging said rack for moving said rack and engaging means.

5. The multiway gravity box and door assembly of claim 1, wherein said openings include track means adjacent at least one of their side edges, said first and second doors being slidable in said track means.

6. The multiway gravity box and door assembly of claim 5, including track means adjacent the other side edges of said openings, said first and second doors also being slidable in said last mentioned track means.

7. The multiway gravity box and door assembly of claim 6, wherein said first and second openings are separated by said partition wall and said last mentioned track means is on the partition wall adjacent said openings.

8. The multiway gravity box and door assembly of claim 1, wherein said engaging means comprises a third slidable door overlying said first and second doors.

9. The multiway gravity box and door assembly of claim 8, wherein said means for moving said engaging means comprises a rack fixed to said engaging means, and a manual hand wheel engaging said rack for moving said rack and engaging means.

10. The multiway gravity box and door assembly of claim 8, wherein said openings include track means adjacent their side edges, said first, second and third doors being slidable in said track means.

11. The multiway gravity box and door assembly of claim 1, wherein both of said first and second doors include a pin receiving opening therein, and said movable engaging means comprises a pin carrier having a pair of spaced pins thereon, said pin carrier being movable to position said pins adjacent the respective pin receiving openings in said first and second doors, and said pins being selectively insertable in one or both of said pin receiving openings to engage said pin carrier with either one or both of said doors.

12. The multiway gravity box and door assembly of claim 11, including resilient mounting means for mounting said pins to said pin carrier for selective insertion and removal in said pin openings, said resilient mounting means retaining said pins on said pin carrier when said pins are removed from said pin openings.

13. The multiway gravity box and door assembly of claim 12, wherein said engaging means comprises a third slidable door overlying said first and second doors, said means for moving said engaging means comprises a rack fixed to said engaging means, and a manual hand wheel engaging said rack for moving said rack and engaging means, and said openings include track means adjacent their side edges, said first, second and third doors being slidable in said track means.

14. The multiway gravity box and door assembly of claim 13, wherein said partition wall separates said first and second openings and also includes track means adjacent said openings, said first and second doors being slidable in said last mentioned track means.

15. The multiway gravity box and door assembly of claim 13, including means for transporting said hopper container.

* * * * *

UNITED STATES PATENT AND TRADEMARK OFFICE
CERTIFICATE OF CORRECTION

PATENT NO. : 4,646,942

DATED : March 3, 1987

INVENTOR(S) : Abe B. Kuhns

It is certified that error appears in the above-identified patent and that said Letters Patent is hereby corrected as shown below:

Column 5, line 48, "8" should read —58—.

Signed and Sealed this

Twenty-second Day of September, 1987

*Attest:*

DONALD J. QUIGG

*Attesting Officer*   *Commissioner of Patents and Trademarks*